Aug. 12, 1924.                                        1,504,965
F. M. NIMS
ANTISKID CHAIN
Filed March 21, 1923
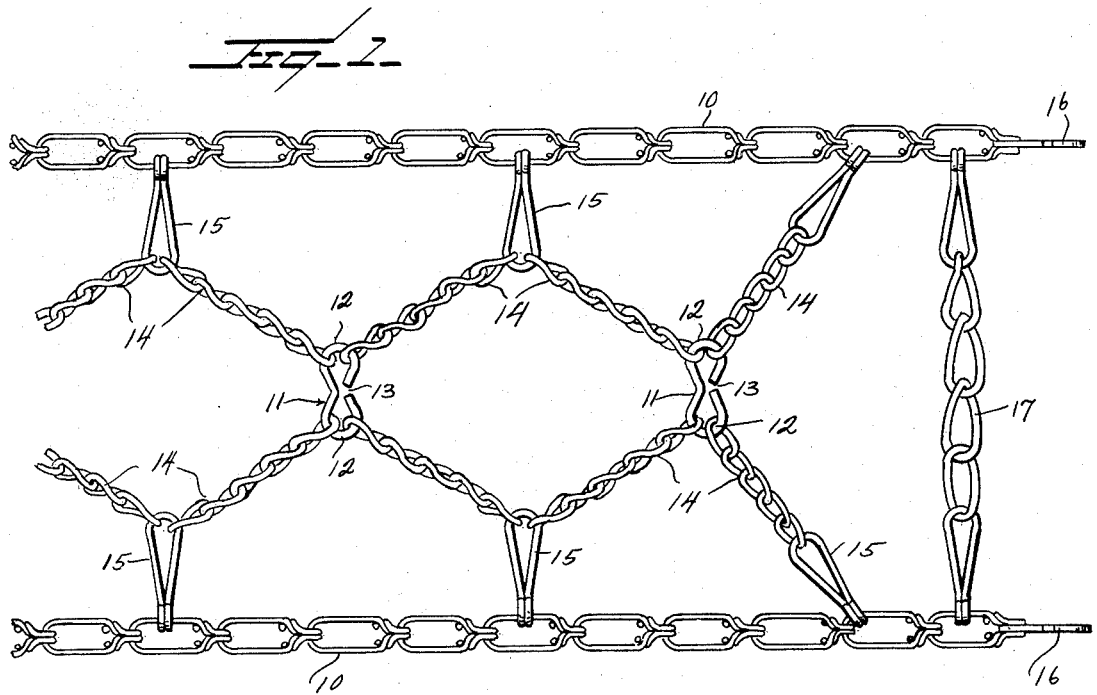
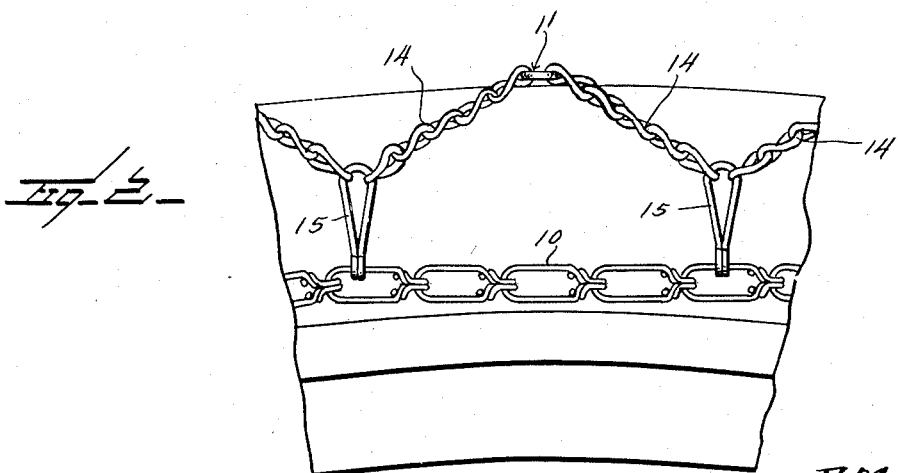
INVENTOR.
F. M. Nims
BY Watson E. Coleman
ATTORNEY.

Patented Aug. 12, 1924.

1,504,965

UNITED STATES PATENT OFFICE.

FRANK M. NIMS, OF MUSKEGON, MICHIGAN, ASSIGNOR OF ONE-FOURTH TO HENRY L. GWATKIN AND ONE-FOURTH TO FLOYD M. GWATKIN, BOTH OF MUSKEGON, MICHIGAN.

ANTISKID CHAIN.

Application filed March 21, 1923. Serial No. 626,561.

*To all whom it may concern:*

Be it known that I, FRANK M. NIMS, a citizen of the United States, residing at Muskegon, in the county of Muskegon and State of Michigan, have invented certain new and useful Improvements in Antiskid Chains, of which the following is a specification, reference being had to the accompanying drawings.

This invention relates to improvements in anti-skid chains for use with pneumatic tires and the like.

An important object of the invention is to provide a chain so constructed that it presents to the road a continuous anti-skidding surface both in the line of direct travel of the vehicle and in line transversely of such line of travel.

As is well known to those familiar with the art, the most dangerous and common form of skidding is that type in which the vehicle slips transversely of the line of travel, this form of skidding being responsible for many collisions which result in considerable damage to the vehicle or persons participating. I have found that this side skid results from the anti-skidding device employed being so constructed as to provide a space wherein the tire is in direct contact with the ice or smooth paving surface during an application of the brakes, particularly where the wheel is locked. Upon such locking of the wheel, the tendency of the vehicle is to slide as regards the rear end, whereas the front wheels being free maintain a frictional engagement with the ground which prevents their movement. This results in the rear end of the vehicle swinging to one side or the other and where straight cross chains of the usual type are employed in the antiskidding device, if one of such cross chains comes into contact during the skidding movement, the direction of skid is in the direction of the length of such cross chain and the same accordingly acts after the manner of a skate, supporting the wheel and accelerating rather than checking the skidding motion.

Another important object of this invention is accordingly to provide a chain, and particularly a cross member for a chain, so constructed that regardless of the direction of movement of the wheel to provide portions extending transversely of such direction of movement and which accordingly exercises scraping effect upon the ground to resist the movement of the wheel in such direction.

A further object of the invention is to provide a cross chain of this type so constructed that the parts thereof act during the skidding movement to increase the tractive effect of the cross chain.

These and other objects I attain by the structure shown in the accompanying drawings, wherein for the purpose of illustration is shown a preferred embodiment of my invention and wherein like reference characters designate like parts throughout.

In the drawings:—

Figure 1 is a plan view of a section of the chain constructed in accordance with my invention; and Figure 2 is a fragmentary side elevation of the tire showing the chain applied thereto.

Referring now more particularly to the drawings, the numeral 10 designates the usual side chains employed in anti-skidding devices. The numeral 11 designates links arranged transversely as respects the chains 10 and midway therebetween, the links being spaced longitudinally of the chains from one another. Each link 11 is substantially in the form of a figure 8, being provided at the ends thereof adjacent the cross chains with eyes 12 separated from one another at the center of the chain by a restriction of the link, as indicated at 13. Engaged with each eye 12 of each link 11 is a pair of chain sections 14, preferably composed of the twisted link commonly employed in the construction of cross chains.

The chain sections 14 engaged with each eye 12 incline toward the adjacent side chain 10 and diverge from one another. The free ends of the chains 14 are engaged with hook links 15 secured to the side chains 10 toward which the chain sections 14 extend and of considerable length, each hook link 15 receiving a chain section 14 from two adjacent transverse or master links 11. The hook links 15 are slightly enlarged at their outer ends so as to accommodate the two chains but are sufficiently restricted to prevent relative shifting of these chains other than ordinary pivotal movement, the purpose of this construction appearing hereinafter.

It will be seen from an inspection of the drawings that the construction hereinbefore referred to provides a plurality of diamond-shaped link sections, each of these sections having its major axis extending longitudinally as respects the completed chain. The links 11 are flatly formed and when the chain is in applied position, as shown in Figure 2, substantially parallel the adjacent surface of the tire and have end portions lying between the upper or gripping surfaces of the chains 14 and the adjacent surface of the tire so that these links 11 are protected by the chains 14 and withheld from engagement with the ground to the extent of engagement of the chains 14. The necessity for this construction will be obvious when it is pointed out that each of these links is subjected to a movement upon a movement of any of the chains 14 engaged therewith and will, therefore, have four times as great a movement as the links of any of the chains 14. Were this movement increased by engagement with the road, it will be obvious that the links 11 would be extremely difficult to maintain in repair, soon wearing out, and allowing the ends of the chains 14 to become released, destroying the efficiency of the chain.

In the operation of the chain, during normal movement of the vehicle, it will be seen that the tendency of the chains 14 and links 11 will be to move longitudinally of the chains 10 as a body. This results in the hook links 15 swinging to an inclined position, with the result that the distance between adjacent ends of transversely aligned hook links 15 is increased and the chains 14 tightened and the breadth of resistive surface between the adjacent ends of the links accordingly increased, adding to the resistance of the chain to slippage. In event of a side skid, the links 15 will swing to a position transversely of the chains 10, placing the engaged ends of the chains 14 in a position where they will come directly into contact with the road to increase the effective resistance of the chains. It will be obvious that if these links 15 were so formed as to admit of excessive movement of the chains 14 with relation thereto, such actions could not result, the ends of the chains engaging the hook links merely riding upon the hook link and not effecting a movement of the hook link until the chain has shifted a considerable distance. Adjacent those ends of the chains 10 provided with the usual connectors 16 a cross chain 17 of the usual construction may be employed so that the free ends of the chains will be held in proper position while securing the same.

I do not wish to be understood as limiting myself to this structure but have found that the same is desirable in conjunction with a chain structure of this type.

What is claimed is:—

In an anti-skid chain, the combination with the usual spaced side chains, of spaced links arranged transversely of the side chains intermediate the same and provided at each end thereof with an eye, said eyes being arranged in a common plane and flatly opposing the tread of a tire to which the chain is attached, a pair of chains engaged with each eye and diverging from one another toward the adjacent side chain, adjacent chains of corresponding eyes of adjacent transverse links converging toward one another, and a hook link secured to each side chain intermediate each pair of adjacent transverse links, each hook link having engaged therewith the free ends of a pair of such adjacent chains.

In testimony whereof I hereunto affix my signature.

FRANK M. NIMS.